US008726252B2

(12) United States Patent
Eichenberger et al.

(10) Patent No.: US 8,726,252 B2
(45) Date of Patent: May 13, 2014

(54) MANAGEMENT OF CONDITIONAL BRANCHES WITHIN A DATA PARALLEL SYSTEM

(75) Inventors: Alexandre E. Eichenberger, Yorktown Heights, NY (US); Brian Flachs, Austin, TX (US); Dorit Nuzman, Israel (IL); Ira Rosen, Israel (IL); Ulrich Weigand, Holzgerlingen (DE); Ayal Zaks, Israel (IL)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 13/016,406

(22) Filed: Jan. 28, 2011

(65) Prior Publication Data
US 2012/0198425 A1  Aug. 2, 2012

(51) Int. Cl.
*G06F 9/45* (2006.01)
*G06F 15/76* (2006.01)

(52) U.S. Cl.
USPC ............... 717/151; 717/140; 712/13; 712/22

(58) Field of Classification Search
None
See application file for complete search history.

(56) References Cited

U.S. PATENT DOCUMENTS

| 5,555,428 | A   | * | 9/1996  | Radigan et al. ............... 712/22 |
| 6,877,088 | B2  |   | 4/2005  | Dice |
| 7,287,152 | B2  | * | 10/2007 | Wilson ......................... 712/226 |
| 7,428,628 | B2  | * | 9/2008  | Fenney .......................... 712/13 |
| 7,584,346 | B1  |   | 9/2009  | Chaudhry |
| 7,594,234 | B1  |   | 9/2009  | Dice |
| 7,757,068 | B2  |   | 7/2010  | Caprioli |
| 7,877,573 | B1  | * | 1/2011  | Le Grand ......................... 712/7 |
| 8,196,127 | B2  | * | 6/2012  | Gschwind ..................... 717/151 |
| 2003/0074544 | A1 | * | 4/2003 | Wilson ......................... 712/226 |
| 2004/0098709 | A1 | * | 5/2004 | Kyo ............................. 717/140 |
| 2005/0198467 | A1 | * | 9/2005 | Fenney .......................... 712/13 |
| 2005/0223200 | A1 |   | 10/2005 | Tremblay |
| 2005/0283774 | A1 | * | 12/2005 | Eichenberger et al. ....... 717/151 |
| 2005/0283775 | A1 | * | 12/2005 | Eichenberger et al. ....... 717/151 |
| 2006/0149953 | A1 | * | 7/2006 | Wilson ........................ 712/245 |
| 2008/0010634 | A1 | * | 1/2008 | Eichenberger et al. ....... 717/151 |
| 2009/0138681 | A1 |   | 5/2009 | Saha |
| 2010/0082939 | A1 | * | 4/2010 | Chong et al. .................... 712/22 |
| 2010/0205585 | A1 | * | 8/2010 | McAllister et al. ........... 717/140 |

OTHER PUBLICATIONS

Jatin Chhugani et al., Efficient implementation of sorting on multi-core SIMD CPU architecutre, 2008 ACM, pp. 1313-1324, <http://dl.acm.org/citation.cfm?id=1454171>.*

(Continued)

*Primary Examiner* — Thuy Dao
*Assistant Examiner* — Cuong V Luu
(74) *Attorney, Agent, or Firm* — David Mims; Mark P Kahler

(57) ABSTRACT

A compiler of a single instruction multiple data (SIMD) information handling system (IHS) identifies "if-then-else" statements that offer opportunity for conditional branch conversion. The SIMD IHS employs a processor or processors to execute the executable program. During execution, the processor generates and updates SIMD lane mask information to track and manage the conditional branch loops of the executing program. The processor saves branch addresses and employs SIMD lane masks to identify conditional branch loops with different branch conditions than previous conditional branch loops. The processor may reduce SIMD IHS processing time during processing of compiled code of the original "if-then-else" statements. The processor continues processing next statements inline after all SIMD lanes are complete, while providing speculative and parallel processing capability for multiple data operations of the executable program.

6 Claims, 3 Drawing Sheets

(56) References Cited

OTHER PUBLICATIONS

Markus Billeter et al., Efficent stream compaction on wide SIMD many-core architecture, 2009 ACM, pp. 159-166, <http://dl.acm.org/citation.cfm?id=1572795>.*

Larry Seiler et al., Larrabee a Many-Core x86 Architecture for Visual Computing, 2008 ACM, 16 pages, <http://dl.acm.org/citation.cfm?id=1360617>.*

GeRard Baudet et al., Optimal Sorting Algorithms for Parallel Computers, 1978 IEEE, pp. 84-87, <http://ieeexplore.ieee.org/stamp/stamp.jsp?tp=&arnumber=1674957>.*

David Tarjan et al., Increasing Memory Miss Tolerance for SIMD Cores, 2009 ACM, 11 pages, <http://dl.acm.org/citation.cfm?id=1654082>.*

Michael Bolotski et al., Unifying FPGAs and SIMD Arrays, 1994 engineer.tamuk.edu, 10 pages, <http://www.engineer.tamuk.edu/departments/eecs/Faculty/rnekovei/RC/Papers%5CFPGA-SIMD.pdf>.*

Meenderinck—"Intra-Vector SIMD Instructions for Core Specialization", Computer Engineering Laboratory, Faculty of Electrical Engineering, Mathematics, and Computer Science Delft University of Technology, Delft, The Netherlands, ICCD 2009, IEEE Conference (Oct. 2009).

* cited by examiner

COMPILER IF-THEN-ELSE STATEMENT PROCESSING METHOD

MANAGEMENT OF CONDITIONAL BRANCHES WITHIN A DATA PARALLEL SYSTEM

BACKGROUND

The disclosures herein relate generally to information handling systems (IHSs), and more specifically, to the management of conditional branching within a speculative data parallel IHS.

Programmers typically write applications in source code, namely a high-level programming language for use by an information handling system (IHS). IHSs employ processors that may execute compilers to convert source code or high-level programming language into a compiled code or object code. The processor of the IHS interprets the compiled code and executes the compiled code. A data parallel IHS may employ multiple processors and multiple execution stages of one or more processors to execute portions of the executable program in a parallel and speculative manner. In this manner, an IHS may achieve improvements in program execution efficiencies. Processors may benefit from improved compiler management of source code in data parallel systems.

BRIEF SUMMARY

In one embodiment, a compiling method is provided that includes receiving, by a compiler in an single instruction multiple data (SIMD) information handling system (IHS), source code information. The method also includes identifying, by the compiler in the SIMD IHS, within the source code information an if-then-else statement opportunity for conversion to first and second branch statements, wherein the first branch statement is a conditional branch and prepare statement, wherein the second branch statement is a branch return statement. The method further includes converting, by the compiler in the SIMD IHS, the if-then-else statement opportunity into the first and second branch statements, thus generating compiled code information. The method still further includes commencing executing, by the SIMD IHS, the compiled code information, the SIMD IHS being configured with a plurality of SIMD lanes. The method also includes generating, by the SIMD IHS, from the compiled code information a SIMD lane mask that identifies SIMD lane conditions thus providing a first mask iteration. The method further includes storing, by the SIMD IHS, a branch address that points to the first branch statement. The method still further includes identifying, by the SIMD IHS, from the compiled code information a first unprocessed lane of the plurality of SIMD lanes. The method also includes determining, by the SIMD IHS, whether the first unprocessed lane directs to target code or inline code, the target code and the inline code being included in the compiled code information. The method further includes executing, by the SIMD IHS, the target code if the determining step identifies the target code for the unprocessed lane. The method further includes executing, by the SIMD IHS, the inline code if the determining step identifies the target code for the unprocessed lane.

In another embodiment, a method of processing a compiled program includes receiving, by an SIMD IHS, compiled code information wherein the compiled code information is generated by identifying within source code information an if-then-else statement opportunity for conversion to first and second branch statements. The first branch statement is a conditional branch and prepare statement. The second branch statement is a branch return statement. The compiled code information is further generated by converting the if-then-else statement opportunity into the first and second branch statements. The method also includes commencing executing, by the SIMD IHS, the compiled code information, the SIMD IHS being configured with a plurality of SIMD lanes. The method further includes generating, by the SIMD IHS, from the compiled code information a SIMD lane mask that identifies SIMD lane conditions thus providing a first mask iteration. The method still further includes storing, by the SIMD IHS, a branch address that points to the first branch statement. The method also includes identifying, by the SIMD IHS, from the compiled code information a first unprocessed lane of the plurality of SIMD lanes. The method further includes determining, by the SIMD IHS, whether the first unprocessed lane directs to target code or inline code, the target code and the inline code being included in the compiled code information. The method still further includes executing, by the SIMD IHS, the target code if the determining step identifies the target code for the first unprocessed lane. The method also includes executing, by the SIMD IHS, the inline code if the determining step identifies the target code for the first unprocessed lane.

In yet another embodiment, a SIMD IHS is disclosed that includes a SIMD processor and a memory coupled to the SIMD processor. The memory is configured with a compiler to receive source code information. The compiler is configured to identify within the source code information an if-then-else statement opportunity for conversion to first and second branch statements. The first branch statement is a conditional branch and prepare statement. The second branch statement is a branch return statement. The compiler is further configured to convert the if-then-else statement opportunity into the first and second branch statements, thus generating compiled code information. The SIMD IHS is configured to commence execution of the compiled code information, the SIMD IHS being configured with a plurality of SIMD lanes. The SIMD IHS is also configured to generate from the compiled code information an SIMD lane mask that identifies SIMD lane conditions thus providing a first mask iteration. The SIMD IHS is further configured to store a branch address that points to the first branch statement. The SIMD IHS is still further configured to identify from the compiled code information a first unprocessed lane of the plurality of SIMD lanes. The SIMD IHS is also configured to determine whether the first unprocessed lane directs to target code or inline code, the target code and the inline code being included in the compiled code information. The SIMD IHS is further configured to execute the target code if the determining step identifies the target code for the first unprocessed lane. The SIMD IHS is still further configured to execute the inline code if the determining step identifies the target code for the first unprocessed lane.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

Figure 1:
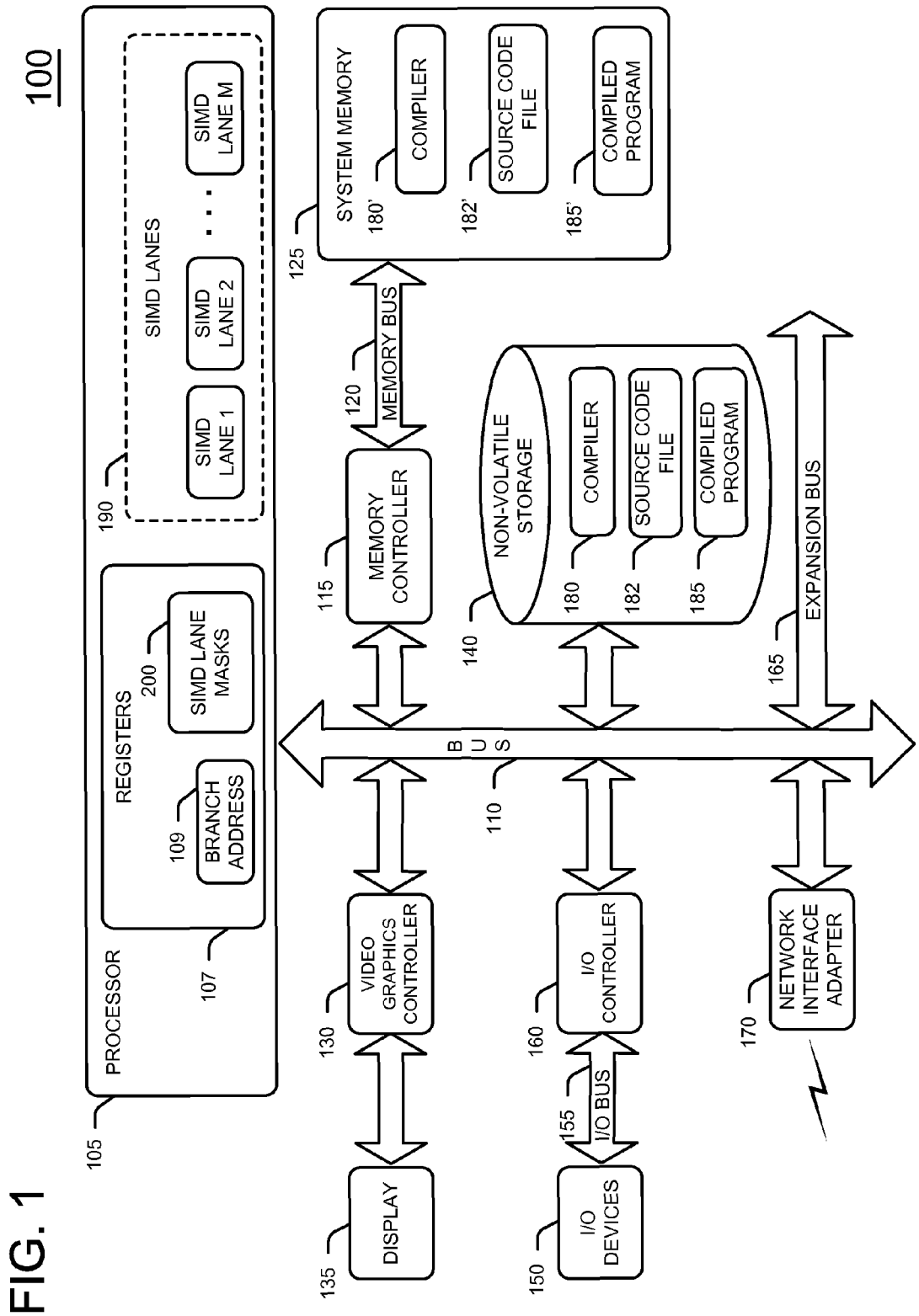
FIG. 1 shows a block diagram of a representative information handling system (IHS) that employs the disclosed compiler management methodology.

Information handling systems (IHSs) typically employ processors with compilers that modify source code into an executable program language, namely object code or compiled code. The IHS may include multiple processors, such as processor cores, or other processor elements for program execution and other tasks. A particular IHS processor may employ multiple executable units or executable stages to provide data parallel program statement execution. Compilers may segment or otherwise divide program statements into statement groups for execution within different execution stages, slices, or lanes. The processor of the IHS may execute program statements in separate lanes during data parallel program execution. In this manner, IHSs may provide for parallel and speculative program execution in a data parallel environment.

One type of data parallel IHS is a single instruction multiple data (SIMD) system. An SIMD IHS may perform operations on multiple data simultaneously. The SIMD IHS employs multiple processors or processor elements that perform operations on multiple data in a speculative and parallel manner. For example, the SIMD IHS may perform data level parallel operations during program execution of compiled code. An SIMD IHS may take advantage of a processor operation that performs global changes such as adding a common value to a large number of data points. This is a common operation in many multimedia applications, such as changing the brightness of a large number of display pixels on an image.

A compiler of an SIMD IHS may generate vectorized code that employs vector style operations that perform repetitious tasks on a data set or data block, such as a data array. SIMD IHSs may manage vectorized code as well as other compiler code output in a data parallel manner.

SIMD IHSs may employ compilers or auto parallelizing compilers, such as an auto parallelizing JAVA compiler during source code or source code file compilation. (JAVA is a trademark of the Oracle Corp.) Auto parallelizing compilers generate compiled code in a parallel information structure. During source code compiling, the compiler may encounter an "if-then-else" statement or "switch" statement as part of the source code or source code information. For programming purposes, an "if-then-else" construct or "if-then-else" statement may be identical to a switch construct or switch statement. When compilation completes, the compiled code may execute within the SIMD IHS processor(s).

An "if-then-else" statement or switch statement is a special "if" statement that the compiler may interpret with unique characteristics. For example, the "if-then-else" statement may provide multiple data operations and multiple paths for data processing within the SIMD IHS.

The compiler may compile an "if-then-else" statement in a serial fashion. In other words, the compiler may generate compiled code to modify the "if-then-else" statement or "if-then-else" construct in a serial mode by generating sequential inline statements. The compiler generates serial statements that correspond to each condition of the "if" statement. A drawback of this serial compiling approach is the loss of parallelism in the final executable program. Serial code does not utilize the parallelism capabilities of the SIMD IHS and does not benefit from IHS improvements in parallel compiled code interpretation and processing. Unpacking and repacking of the data that enters and exits serial code execution is another drawback of serial code compilation.

The compiler may compile an "if-then-else" statement into multiple paths using if-conversion techniques, such as both processing of the then-path and the else-path of the "if-then-else" statement in parallel. The compiler may generate compiled code that provides for execution of both paths of the "if-then-else" statement during program execution. For example, the SIMD IHS may use a predicate system and generate a set of conditional move and select statements to generate identical results to the "if-then-else" statement. However, one drawback of if-conversion compiling is that the net path length of the compiled code is the sum of the "then" and "else" cause path lengths in addition to any conditional move instructions that the compiler requires to merge "then" and "else" computations back together after process completion.

In one embodiment, the disclosed SIMD IHS employs a compiler or auto parallelizing compiler that includes processor capability for data parallel operations and speculative program execution. In one embodiment, the compiler may convert "if-then-else" statements into "conditional branch and prepare" statements and "branch return" statements. The "conditional branch and prepare" statements along with the branch return statements provide program execution of "if-then-else" statements with potentially less executable code length than other compiler techniques. During compilation in the disclosed SIMD capable IHS, the compiler may group multiple "if-then-else" statements with multiple "if-then-else" statements that process similar or related data to reduce total object code length.

Replacing an "if-then-else" statement group with "conditional branch and prepare statements" as well as "branch return" statements provides executable processing loops around the "if-then-else" statement group. A particular program or executable program may benefit from such "if-then-else" statement conversion during speculative execution in a data parallel processor such as within the disclosed SIMD IHS, as described in more detail below.

FIG. 1 shows an information handling system (IHS) 100 including a single instruction multiple data (SIMD) processor 105 that employs the disclosed compiler management methodology. In one embodiment, processor 105 may include multiple processor cores (not shown). IHS 100 processes, transfers, communicates, modifies, stores or otherwise handles information in digital form, analog form or other form. Processor 105 includes registers 107 that include a branch address register 109 and SIMD lane masks 200. In one embodiment, SIMD lane masks 200 may employ multiple registers within registers 107. For convenience, branch address 109 and branch address register 109 that stores that branch address both exhibit the same component number. Processor 105 includes SIMD lanes 190, namely SIMD lane 1, SIMD lane 2, . . . SIMD lane M, wherein M is the total number of SIMD lanes. In one embodiment, IHS 100 may implement SIMD lanes 190 as a virtual representation of virtual execution elements for SIMD processing.

IHS 100 includes a bus 110 that couples processor 105 to system memory 125 via a memory controller 115 and memory bus 120. In one embodiment, system memory 125 is external to processor 105. System memory 125 may be a static random access memory (SRAM) array or a dynamic random access memory (DRAM) array. Processor 105 may also include local memory (not shown) such as L1 and L2 caches (not shown). A video graphics controller 130 couples display 135 to bus 110. Nonvolatile storage 140, such as a hard disk drive, CD drive, DVD drive, or other nonvolatile storage couples to bus 110 to provide IHS 100 with permanent storage of information. I/O devices 150, such as a keyboard and a mouse pointing device, couple to bus 110 via I/O controller 160 and I/O bus 155.

One or more expansion busses 165, such as USB, IEEE 1394 bus, ATA, SATA, PCI, PCIE, DVI, HDMI and other busses, couple to bus 110 to facilitate the connection of peripherals and devices to IHS 100. A network interface adapter 170 couples to bus 110 to enable IHS 100 to connect by wire or wirelessly to a network and other information handling systems. In this embodiment, network interface adapter 170 may also be called a network communication adapter or a network adapter. While FIG. 1 shows one IHS that employs processor 105, the IHS may take many forms. For example, IHS 100 may take the form of a desktop, server, portable, laptop, notebook, netbook, tablet or other form factor computer or data processing system.

IHS 100 may take other form factors such as a gaming device, a personal digital assistant (PDA), a portable telephone device, a communication device or other devices that include a processor and memory. In IHS 100 nonvolatile storage 145 stores a compiler 180, a source code file 182, and a compiled program 185. When IHS 100 initializes, the IHS loads compiler 180, the source code file 182, and compiled program 185 into system memory 125 for execution as compiler 180', source code file 182', and compiled program 185', respectively.

Compiler 180 generates executable compiled program 185 from source code file 182 that may include "if-then-else" statements. The source code file 182 provides input to the disclosed compiler management methodology. During source code file 182 compiling, compiler 180 may replace an "if-then-else" statement or "if-then-else" statement groups with branch statements, such as "conditional branch and prepare" statements as well as branch return statements. Branch statements may provide processing loops around the "if-then-else" statements during compiled program 185 execution. The processing loops may repeat for each SIMD lane of SIMD lanes 190 within SIMD IHS 100 that behaves differently from the initial SIMD lane or initial "if-then-else" statement encounter of an "if-then-else" statement group. As described above, processor 105 may include multiple SIMD lanes 190, such as SIMD lane 1, SIMD lane 2, ... SIMD lane M, wherein M is the total number of SIMD lanes. In one embodiment, processor 105 may generate SIMD lanes 190 in a virtual implementation and employ each SIMD lane of SIMD lanes 190 during execution of compiled program 185.

Processor 105 may save the branch address 109 that corresponds to the initial "conditional branch and prepare" statement of executable compiled program 185. For example, processor 105 may store branch address 109 within registers 107 or other memory location of the SIMD IHS. Branch address 109 may provide the loop return for looping conditional branch statements. During execution of compiled code 185, processor 105 either processes directly to the target statement or continues processing inline according to the condition of the first SIMD lane, namely SIMD lane 1. For example, the result of the "then-else" portion of the original "if-then-else" statement directs to either target or inline statements corresponding to the branch statements that compiler 180 generates.

In one embodiment of the disclosed compiler management method, processor 105 generates one or more masks, such as SIMD lane masks 200. SIMD lane masks 200 may indicate active lanes and next lanes, such as those of SIMD lanes 190, that branch in different directions from the first lane, namely SIMD 1, during processor 105 processing of compiled program 185. Compiler 180 may generate branch return or branch retry statements that respond to active mask bits of SIMD lane masks 200, as described in more detail below.

During compiling, compiler 180 may encounter source code file 182 information containing an "if-then-else" statement or identical "if-then-else" construct set as shown below in Table 1. Compiler 180 may analyze the "if-then-else" statement for branch statement conversion opportunities. Table 1 below shows an example of an "if-then-else" statement or "if-then-else" construct that compiler 180 may consider for branch statement conversion during compiling of source code file 182 information into compiled program 185.

TABLE 1

| If-then-else or switch statement | |
| --- | --- |
| 1 | if (condition) then (consequent) |
| 2 | else (alternative) |
| 3 | end If |

As shown in Table 1 above, processor 105 may process source code file 182 information that employs one or more "if-then-else" statements or switch statements. Processor 105 or other interpreter (not shown) of processor 105 may test the "if" condition, as shown in row 1 of Table 1, for true or false status. If the "condition" test is true during an "if-then-else" statement interpretation, processor 105 directs compiled program 185 processing to the "consequent" target. The consequent target may be one or more statements (not shown), such as a corresponding statement block that provides compiled program 185 process flow in the "then" direction. However, if the condition test is false, processor 105 directs compiled program 185 processing to the "alternative" target, as shown in row 2 of Table 1. The alternative target may be one or more statements (not shown) that provide compiled program 185 process flow in the "else" direction for the "if-then-else" statement. The "end if", as shown in row 3 of Table 1, shows the end to the "if-then-else" statement of Table 1 above.

In another embodiment, the consequent target or the alternative target may be a branch to another section of code of compiled program 185. Processor 105 may interpret and execute the consequent target or alternative target branch code in accordance with the structure of the compiled code, such as that of compiled program 185 during execution. After either branch of then or else, namely the consequent target or the alternative target respectively, processor 105 returns program execution flow to statements (not shown) following the "end if" statement.

In one embodiment, an "if-then-else" statement may follow a "for" statement in compiler source code file 182, as shown in Table 2 below.

TABLE 2

| If-then-else or switch statement following for statement | |
| --- | --- |
| 1 | for (I=1, I=2, ... I=N) |
| 2 | if (condition) then (consequent) |
| 3 | else (alternative) |
| 4 | end If |
| 5 | end for |

In this example, the "if-then-else" statement will repeat N times, wherein N is the final count for iterating the "I" variable of the "for" statement in Table 2 above, row 1. This arrangement of statements provides one branch statement conversion opportunity for compiler 180. In one embodiment, processor 105 may process each "for" loop, namely "for" loop I=0 through "for" loop I=N to form a unique SIMD lane (not shown) within processor 105 for each loop. Compiler 180 may test to determine eligibility for branch conversion by evaluating dependencies between lanes of the "for" loops that it processes. In one embodiment, compiler 180 provides branch statement conversion on those SIMD lanes that are not dependent on previous SIMD lanes of the same "for" loop for information.

Following row 1, Table 1 shows an "if-then-else" statement set identical to that of Table 1 above in row 2 through row 4 of Table 2, respectively. After processor 105 completes processing of all "for" loops, program execution returns to statements (not shown) following the "end for" statement, as shown in row 5 of Table 2 above.

As shown in Table 2 above, compiler 180 may identify and categorize a particular source code construct as an if-then-else or switch statement eligible for data parallel operations. The "if-then-else" statement may be eligible for data parallel operations if the "if-then-else" statement provides multiple data operations on common data. In the example of Table 2, the "if-then-else" statement may loop or otherwise repeat through each iteration of the "for" statement. The iterations or loops may provide IHS 100 with multiple data parallel operations after compiler 180 compiles source code file 182 into executable compiled program 185.

Processor 105 may generate program execution parallel operations within multiple SIMD lanes in a virtual manner. Each SIMD lane provides a parallel operation capability for processor 105 SIMD statement execution. Processor 105 may monitor and provide for speculative capability within each SIMD lane. Processor 105 may provide dead end monitoring, such as for SIMD processes that do not complete or end properly, for each SIMD lane as well as other data parallel capabilities. Processor 105 may require compiled program 185 code re-integration after speculative or parallel operations separate portions of the total executable compiled code of compiled program 185 during execution.

In one embodiment, compiler 180 provides conditional branching by creating a loop around the "if-then-else" statement, shown in Table 2 above, that repeats for each SIMD lane behaving differently than the first SIMD lane. In other words, each "if-then-else" loop of the "for" statement of Table 2 above may correspond to one SIMD lane of processor 105. In one example, processor 105 interprets the "if-then-else" statement, as shown in Table 2 above, into 8 SIMD lanes thus providing 8 process loops. In this example, N=8, providing 8 iterations of the variable I.

In one embodiment, compiler 180 replaces an "if-then-else" statement or group of "if-then-else" statements with one or more branch statements and supporting structure. For example, compiler 180 may convert a particular "if-then-else" statement with one conditional branch prepare statement, one branch return statement, and supporting conditional branch structure as shown in Table 3 below.

TABLE 3

Compiler branch statement conversion that includes a "conditional and prepare" statement as well as a "branch return" statement

| 1 | If (condition) then | |
| | goto target | |
| 2 | else (alternative) | - ("inline code" with respect to row 1 above) |
| 3 | goto continue point | |
| 4 | Target | - ("target code" with respect to row 1 above) |
| 5 | then code (consequent) | |

TABLE 3-continued

Compiler branch statement conversion that includes a "conditional and prepare" statement as well as a "branch return" statement

| 6 | continue point |
| 7 | branch return |

The statements shown in Table 3 above represent a direct SIMD replacement or conversion of the statements of Table 2. Processor 105 may categorize a particular construct or source code statement as an "if-then-else" or switch statement eligible for data parallel operations provided that the "if-then-else" or switch statement includes multiple data operations as well as other factors. As used herein, rows 1-5 of Table 1 together form a "conditional branch and prepare" statement.

Compiler 180 may replace the statements of Table 2 above with a conditional "if" statement, as shown in row 1 of Table 3 above, as well as "else", "goto", "target", "then", "continue", and "branch return" statements of row 2 through row 7, respectively, as shown in Table 3 above. Row 1 of Table 3 shows the initial conditional branch and prepare statement. In one embodiment, compiler 180 generates conditional branch loops for each "if-then-else" statement as shown in Table 2 above. In one example, processor 105 may employ one SIMD lane for each if-then-else loop of the "for" statement as shown in Table 2 above. Processor 105 may execute the branch statements as shown in Table 3 by employing 8 SIMD lanes that correspond to the original "if-then-else" statement "for" loops of Table 2 above.

For example, processor 105 may interpret the "if-then-else" statement, as shown in Table 2 above, into 8 SIMD lanes, such as those of SIMD lanes 190, thus providing 8 process loops corresponding to the branch statements of Table 3. Each SIMD lane corresponds to N=1 through N=8, respectively of the 8 "for" loops as shown in Table 2 above. In this case, processor 105 may employ an 8 bit mask to keep track of SIMD lane activity and conditional behavioral comparison between previous processing SIMD lanes of SIMD lanes 190. After processor 105 completes the processing of all 8 SIMD lanes that correspond to the statements of Table 3 above, process flow will continue inline with the next statement (not shown) of compiled program 185.

In more detail, row 1 of Table 3 above shows a "conditional branch and prepare statement" that directs program flow to a "target" statement, as shown in row 4, if the "condition", as shown in row 1 of Table 3 is true. The target statement is followed by the then code or "consequent" that may be identical to the consequent of Table 2 above. If the condition is not true, or false, flow directs to an else "alternative" code, as shown in row 2 of Table 3 above. The else or alternative code is inline code directly following the if "conditional branch and prepare" statement of row 1. The alternative, as shown in row 2, may be identical to the alternative as shown in Table 2 above.

Following the "else" statement, Table 3 shows a "goto continue point" statement in row 3. The "goto continue point" statement is not conditional and directs flow to the "continue point" statement as shown in row 6. The compiler 180 branch statement conversion that includes conditional and prepare as well as "branch return" statements and supporting statements ends with a "branch return" statement in row 7. The "branch return" statement provides for process flow or branch retry capability by processor 105. Processor 105 employs branch address 109 to determine the correct position within the code, such as the conditional branch statement, a shown by row 1, in Table 3 above.

After analysis of each "if-then-else" statement, as well as all other source code, compiler 180 completes conversion of source code file 182 into compiled code. In this manner compiler 180, using source code file 182 as input, generates compiled code or compiled program 185 as output for execution with IHS 100. During normal operation of IHS 100, processor 105 may execute compiled program 185 consistent with the compiler 180 output. During compiled program 185 execution, processor 105 may employ SIMD lanes 190 and SIMD lane masks 200 to manage compiled program 185 execution.

Figure 2:
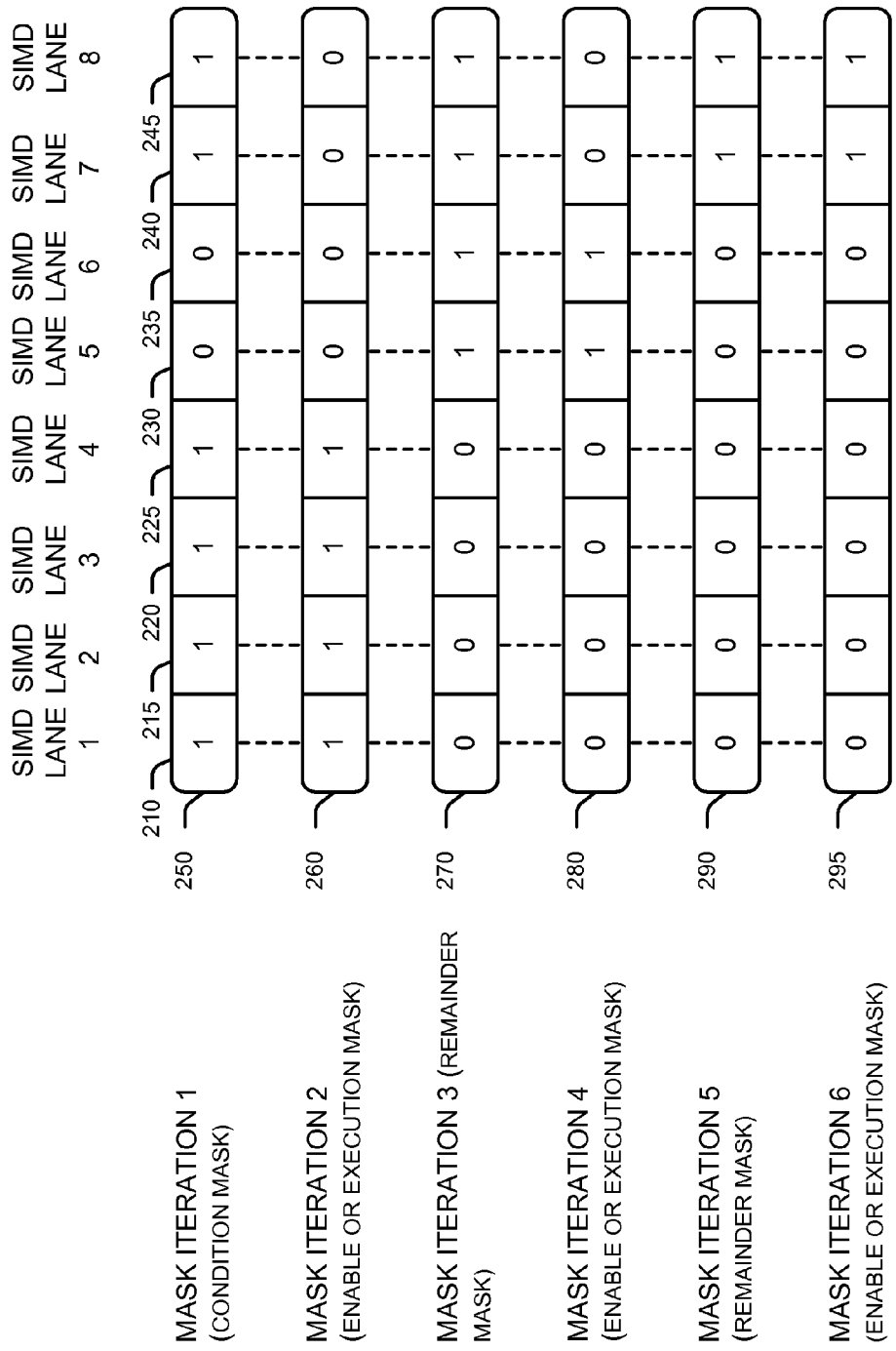
FIG. 2 shows single instruction multiple data (SIMD) lane masks that one embodiment of the disclosed compiler management method employs.

FIG. 2 is a diagram of SIMD lane masks 200 that shows a progression or iteration of masks that processor 105 employs according to the disclosed compiler management methodology. SIMD lane masks 200 includes a respective row for each mask iteration, namely mask iteration 1 through mask iteration 6. SIMD lane masks 200 include a respective column for each SIMD lane, namely SIMD lane 1 through SIMD lane 8. In one embodiment, each SIMD lane, namely SIMD lane 1 through SIMD lane 8 of SIMD lane masks 200 corresponds to the SIMD lanes of SIMD lanes 190. Each intersection of a mask iteration and an SIMD lane includes a mask bit that exhibits either a "1" or "0" bit of information.

For example, each loop of the branch statements of Table 3 above corresponds to one SIMD lane, as shown in SIMD lane masks 200. SIMD lane masks 200 includes 8 SIMD lanes, the first four lanes include SIMD lane 1 in column 210, SIMD lane 2 in column 215, SIMD lane 3 in column 220, and SIMD lane 4 in column 225. The next four lanes include SIMD lane 5 in column 230, SIMD lane 6 in column 235, SIMD lane 7 in column 240, and SIMD lane 8 in column 245.

From top to bottom, SIMD lane masks 200 of FIG. 2 shows multiple iterations of SIMD lane masks beginning with mask iteration 1 in row 250. Mask iteration 2 through mask iteration 6 are shown in row 260, 270, 280, 290 and 295, respectively. Processor 105 may store SIMD lane masks in registers 107 as mask iteration 1 through mask iteration 6, respectively. SIMD lane masks 200 may store multiple masks or reuse mask memory locations within registers 107 during processor 105 SIMD lane mask generation and manipulation. Processor 105 may store SIMD lane masks in other memory locations of IHS 100, such as system memory 125 or other memory stores (not shown).

In one embodiment of the disclosed compiler management method, processor 105 generates mask iteration 1, as shown in row 250, as a condition mask. Mask iteration 1 includes a bit, either 1 or 0, that represents the condition for each loop or SIMD lane corresponding to the branch statements of Table 3 above. In other words, the branch statements of Table 3 above represent 8 loops and corresponding SIMD lanes of executing compiled program 185. In one embodiment, during compiled program 185 execution, processor 105 determines the initial conditions for each SIMD lane, namely SIMD lane 1 through SIMD lane 8 and respectively stores therein a "1" bit for true, or a "0" bit for false condition states. Stated another way, a "1" bit in mask iteration 1, as shown in row 250, represents a true condition or "then" result for the corresponding SIMD lane. Similarly, a "0" bit in mask iteration 1, as shown in row 250, represents a false condition or "else" result for the corresponding SIMD lane.

From left to right, mask iteration 1 in row 250 shows SIMD lane bits of 1,1,1,1,0,0,1,1 for SIMD lane 1 through SIMD 8 lane, respectively. In other words, mask iteration 1 represents a condition mask that includes 8 conditions of true, true, true, true, false, false, true, true for SIMD lane 1 through SIMD lane 8, respectively. In one embodiment, a "1" bit in mask iteration 1 represents a true or "then" condition for the statements corresponding to the "if-then-else" statement of Table 2. The same "1" bit of mask iteration 1 represents a true condition or "target" destination for the branch statement conversion of Table 3 above. Alternately, a "0" bit in mask iteration 1 represents a false or "else" condition for the statements corresponding to the "if-then-else" statement of Table 2. The same "0" bit of mask iteration 1 represents a false condition or "alternative" destination for the branch statement conversion shown in Table 3 above.

From the information of mask iteration 1, processor 105 generates mask iteration 2, as shown in row 260. Mask iteration 2 is an enable or execution mask. Processor 105 analyzes mask iteration 1 from left to right, or SIMD lane 1 through SIMD lane 8, for the first condition that does not match SIMD lane 1. Processor 105 populates mask iteration 2 SIMD lane locations with "1" bits for each SIMD lane that matches the condition, namely "1" of mask iteration 1, SIMD lane 1, as shown in column 210, row 250. In this manner, processor 105 populates mask iteration 2 SIMD lane 1 through SIMD lane 4 with 1,1,1,1, respectively.

Processor 105 populates the remaining cells of mask iteration 2 with "0" bits. In other words, processor 105 populates SIMD lane 5 through SIMD lane 8 of mask iteration 2 with 0,0,0,0, respectively. In this manner, mask iteration 2 includes a SIMD lane bit of "1" for each SIMD lane that matches the condition of SIMD lane 1 of mask iteration 1, and a "0" bit in each cell for all remaining lanes including the first mismatch or different condition lane, namely SIMD lane 5 of mask iteration 1. Processor 105 may now process SIMD lane 1 through SIMD lane 4. In other words, the statements as shown in Table 3, that include the conditions shown in SIMD lane masks 200 are ready for execution by processor 105. Processor 105 may interpret the "1" bits, as shown in mask iteration 2 as execution eligibility status information. The eligibility status or eligibility bits correspond to their respective SIMD lanes, namely SIMD lane 1 through SIMD lane 4 in mask iteration 2 in row 260 of SIMD lane masks 200.

Processor 105 generates a remainder mask, namely mask iteration 3, as shown in row 270, by determination of those SIMD lanes that did not process from the information within mask iteration 2. In this example, SIMD lane 5 through SIMD lane 8 were not eligible to process from the information within mask iteration 2. Processor 105 populates mask iteration 3 with 0,0,0,0, for SIMD lane 1 through SIMD lane 4 respectively to demonstrate the process ineligibility for these lanes. Alternately, processor 105 populates mask iteration 3 with 1,1,1,1, for SIMD lane 5 through SIMD lane 8, respectively, to demonstrate the eligibility to process these lanes.

Prior to execution of the remaining lanes, namely SIMD lane 5 through SIMD lane 8, processor 105 should determine eligibility again in a similar manner to the first enable or execution mask, namely mask iteration 2. Processor 105 evaluates the information again in mask iteration 1 and determines that the remaining SIMD lanes, namely SIMD lane 5 through SIMD 8 include two lanes with common conditions. Both SIMD lane 5 and SIMD lane 6 include condition bits of "0" in column 5 and column 6, and row 250 respectively. In this case, processor 105 generates mask iteration 4 with both SIMD lane 5 and SIMD lane 6 eligible for execution. Processor 105 generates mask iteration 4 with bits 0,0,0,0,1,1,0,0 for SIMD lane 1 through SIMD lane 8, respectively. Processor 105 may now process SIMD lane 5 and SIMD lane 6 of compiled program 185.

Processor 105 generates another remainder mask, namely mask iteration 5 to reflect the remaining SIMD lanes that processor 105 did not process. Both SIMD lane 7 and SIMD lane 8 are eligible for processing and processor 105 generates mask iteration 5 with bits 0,0,0,0,0,0,1,1 for SIMD lane 1 through SIMD lane 8, respectively. Processor 105 repeats the process of enable or execution mask generation and remainder mask generation until processor 105 processes all SIMD lanes. For the example of FIG. 2, processor 105 generates a final enable or execution mask, namely mask iteration 6, that reflects the final processing eligibility of SIMD lane 7 and SIMD lane 8. Processor 105 may then process SIMD lane 7 and SIMD lane 8 prior to processing the next instructions after the branch statements of Table 3 above.

Processor 105 may initiate processing of SIMD lane 1 through SIMD lane 8 in order. However, in a speculative processing environment, such as that of SIMD IHS 100, processor 105 may perform out-of-order and parallel processing for each of the respective lanes associated with SIMD lane masks 200. Processor 105 will reorder the out-of-order processing statements prior to final statement or instruction completion. In other embodiments, SIMD lanes masks 200 may employ different SIMD lane counts other than 8 depending on the particular application. Compiler 180 may provide input into processor 105 selection of SIMD lane counts during execution of compiled code, such as compiled program 185.

Figure 3:
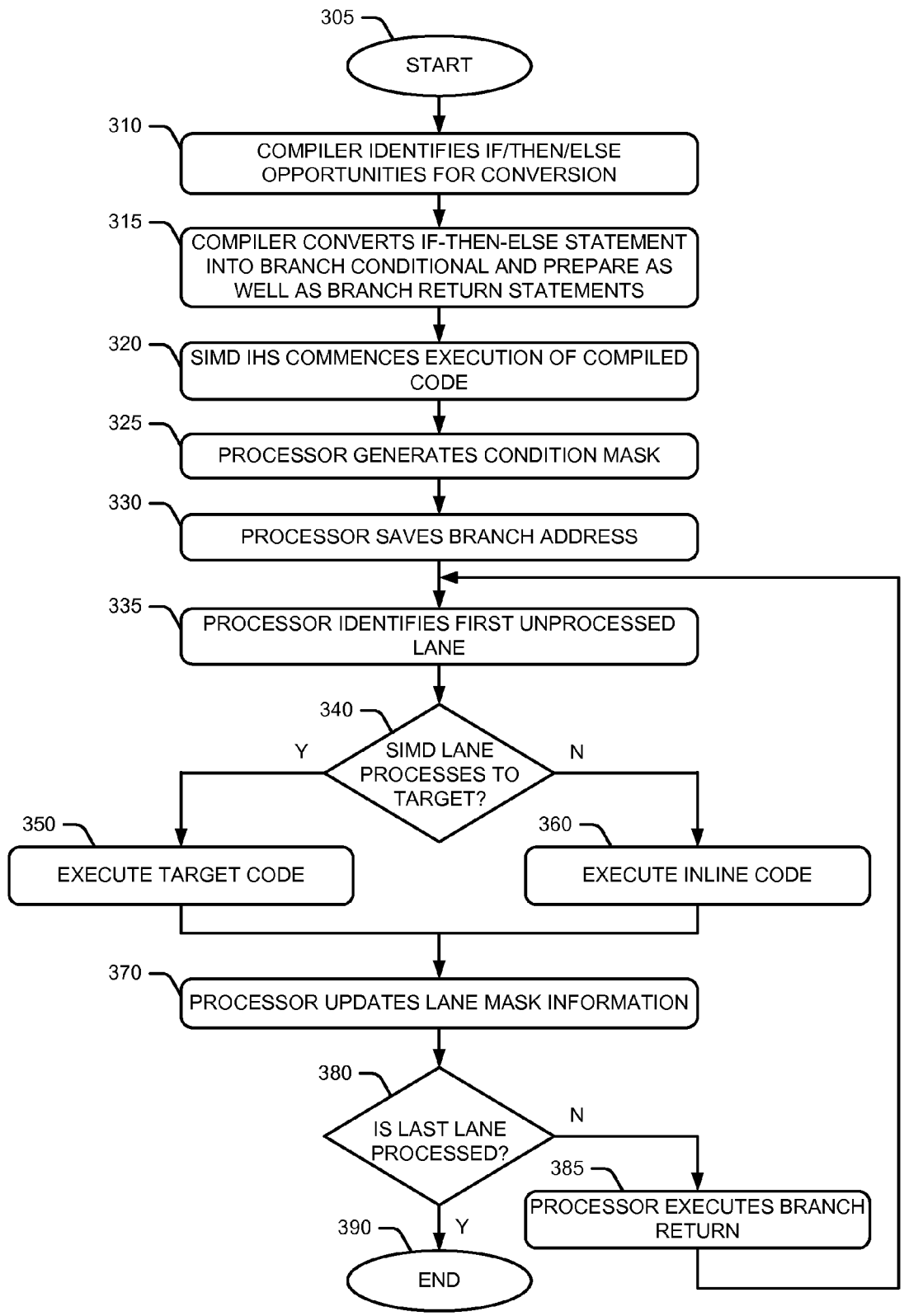
FIG. 3 depicts a flowchart of an embodiment of the disclosed compiler management method that provides IHS compiler conditional branch processing.

FIG. 3 is a flowchart that shows process flow in an embodiment of the disclosed compiler management methodology that provides "if-then-else" statement conversion in an SIMD IHS. The flowchart of FIG. 3 shows how compiler 180 may identify opportunities for "if-then-else" statement conversion into branch statements prior to execution of compiled program 185. During compiled program 185 execution, processor 105 may provide mask generation, such as the masks shown in SIMD lane masks 200 to provide input into data parallel operations within IHS 100. The disclosed compiler management method starts, as per block 305. In one embodiment, compiler 180 identifies "if-then-else" statement opportunities for conversion, as per block 310. In other words, compiler 180 identifies particular "if-then-else" statement opportunities for branch statement conversion, such as shown in Table 3 above.

Compiler 180 converts "if-then-else" statements into "conditional branch and prepare" statements as well as branch return statements, as per block 315. For example, compiler 180 converts the particular "if-then-else" statement as shown in Table 2 above into branch statements as shown in Table 3 above. SIMD IHS 100 commences execution of compiled code, as per block 320. SIMD IHS 100 executes compiled program 185 as the compiled computer language code, or source code file 182 output of compiler 180. Processor 105 generates a condition mask, as per block 325.

In one embodiment, during execution of compiled program 185, processor 105 begins execution or processing of the branch statements of Table 3 above as replacement or conversion of the "if-then-else" statements of Table 2 above. Initially, processor 105 generates a condition mask, namely mask iteration 1 of SIMD lane masks 200. In this manner, the first mask iteration, or mask iteration 1 includes a respective bit representing the condition for each lane, namely each of SIMD lane 1 through SIMD lane 8 of SIMD lanes 190. Each SIMD lane of SIMD lanes 190 as shown in FIG. 2 as well, may correspond to a particular loop or pass through the "if-then-else" statements of Table 3 above.

Processor 105 saves the branch address, as per block 330. In other words, processor 105 saves the address that points to the initial conditional branch statement, as shown in Table 3, row 1 above. In this manner, processor 105 may later loop or return to the start of the branch statements, as shown in Table 3 above, that provide conversion replacement for the "if-then-else" statements of Table 2 above. Processor 105 identifies the first unprocessed lane, as per block 335. For example, as shown in FIG. 2, SIMD lane 1 is the first unprocessed lane of SIMD lane 1 through SIMD lane 8.

Processor 105 of SIMD IHS 100 performs a test to determine if the SIMD lane processes to target, as per decision block 340. In one embodiment, if the condition bit in mask iteration 1 and SIMD lane 1, namely row 250, column 210, is a "1", then the condition is true and processing directs to the target statement, as shown in row 4 of Table 3 above. In that case, processor 105 executes target code, as per block 350. However, if the condition bit in mask iteration 1 and SIMD lane 1 is a "0", then the condition is false and processing directs to the inline statement, as shown in row 2 of Table 3 above. In that case processor 105 executes inline code, as per block 360.

Processor 105 updates lane mask information, as per block 370. As shown in SIMD lane masks 200 of FIG. 2 above, processor 105 updates SIMD lane information for SIMD lane 1 through SIMD lane 8 with enable or execution information and remainder information for each loop or pass through an SIMD lane. In this manner, processor 105 generates a next mask iteration or mask iteration 2 through mask iteration 6, from the initial lane mask or mask iteration 1. Processor 105 performs a test to determine if processor 105 has processed the last lane, as per decision block 380. In other words, processor 105 analyzes the remainder mask information such as that of mask iteration 5 to determine those lanes that still require processing. If the last lane of SIMD lanes shown in FIG. 2, namely SIMD lane 8, is not yet processed, processor 105 executes branch return, as per block 385. More specifically, processor 105 executes the "branch return" statement, as shown in row 7 of Table 3 above.

Returning to block 335, processor 105 continues indentifying and processing unprocessed SIMD lanes until all SIMD lanes are complete. When processing of all SIMD lanes completes, the compiler management method ends, as per block 390. Compiler 180 may segment or otherwise divide a large number of "if-then-else" statement loops into multiple groups. In that case, processor 105 may manage each group through a common set of lanes, such as those shown in SIMD lane masks 200. Processor 105 may use speculative and parallel processing techniques to re-integrate the "if-then-else" statements or branch statements after execution.

Compiler 180 compiles source code file 182 that may include "if-then-else" statement opportunities for conversion into executable compiled code, such as compiled program 185. Processor 105 may then execute the compiled program 185 during normal operation of IHS 100. At execution time, processor 105 may employ SIMD lanes 190 to process SIMD structures that compiler 180 generates within compiled program 185. During execution, processor 105 may employ registers 107, for example branch address register 109, to keep track of branch return points within compiled program 185. The branch return points may correspond to the "for" loops that compiler 180 replaces during compiling of source code file 182 statements, such as those of Table 2 above. Compiler 180 converts the "if-then-else" statement opportunities of Table 2 above into branch and returns statements, such as those of Table 3 above. In this manner, processor 105 may exhibit improvements in SIMD processing efficiencies within IHS 100 when executing compiled program 185.

As will be appreciated by one skilled in the art, aspects of the disclosed load balancing management technology may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method comprising:
receiving, by a single instruction multiple data (SIMD) information handling system (IHS), source code information;
identifying, by the SIMD IHS, within the source code information an if-then-else statement opportunity for conversion to first and second branch statements, wherein the first branch statement is a conditional branch and prepare statement, wherein the second branch statement is a branch return statement;
converting, by the SIMD IHS, the if-then-else statement opportunity into the first and second branch statements, thus generating compiled code information;
commencing speculatively executing, by the SIMD IHS, the compiled code information, the SIMD IHS being configured with a plurality of SIMD lanes;
generating, by the SIMD IHS, from the compiled code information a SIMD lane mask that identifies SIMD lane conditions thus providing a first mask iteration;
storing, by the SIMD IHS, a branch address that points to the first branch statement;
identifying, by the SIMD IHS, from the compiled code information a first unprocessed lane of the plurality of SIMD lanes;
determining, by the SIMD IHS, whether the first unprocessed lane directs to target code or inline code, the target code and the inline code being included in the compiled code information;
executing, by the SIMD IHS, the target code if the determining step identifies the target code for the unprocessed lane;
executing, by the SIMD IHS, the inline code if the determining step identifies the inline code for the unprocessed lane;
updating, by the SIMD IHS, the SIMD lane mask thus providing a next mask iteration;
testing, by the SIMD IHS, to determine if all SIMD lanes are processed; and
branching, by the SIMD IHS, to the stored branch address if the testing step determines that all SIMD lanes are not processed.

2. The method of claim 1, wherein the updating step comprises:
updating the SIMD lane mask to provide an eligibility status of each of the plurality of SIMD lanes, the eligibility status indicating whether a particular SIMD lane is eligible for processing.

3. The method of claim 1, wherein the updating step comprises:
updating the SIMD lane mask to reflect a remainder status of each of the plurality of SIMD Lanes, the remainder status indicating whether a particular SIMD lane is still unprocessed.

4. A single instruction multiple data (SIMD) information handling system (IHS), comprising:
a SIMD processor;
a memory coupled to the SIMD processor, the memory being configured to:
receive source code information;
identify within the source code information an if-then-else statement opportunity for conversion to first and second branch statements, wherein the first branch statement is a conditional branch and prepare statement, wherein the second branch statement is a branch return statement;
convert the if-then-else statement opportunity into the first and second branch statements, thus generating compiled code information;
commence speculatively executing, by the SIMD IHS, the compiled code information, the SIMD IHS being configured with a plurality of SIMD lanes;
generate, by the SIMD IHS, from the compiled code information a SIMD lane mask that identifies SIMD lane conditions thus providing a first mask iteration;
store, by the SIMD IHS, a branch address that points to the first branch statement;
identify, by the SIMD IHS, from the compiled code information a first unprocessed lane of the plurality of SIMD lanes;
determine, by the SIMD IHS, whether the first unprocessed lane directs to target code or inline code, the target code and the inline code being included in the compiled code information;
execute, by the SIMD IHS, the target code if the determining step identifies the target code for the first unprocessed lane;
execute, by the SIMD IHS, the inline code if the determining step identifies the inline code for the first unprocessed lane;
update, by the SIMD IHS, the SIMD lane mask thus providing a next mask iteration;
test, by the SIMD IHS, to determine if all SIMD lanes are processed; and
branch, by the SIMD IHS, to the stored branch address if the testing step determines that all SIMD lanes are not processed.

5. The SIMD IHS of claim 4, wherein the memory is further configured to:
   update the SIMD lane mask to provide an eligibility status of each of the plurality of SIMD lanes, the eligibility status indicating whether a particular SIMD lane is eligible for processing.

6. The SIMD IHS of claim 4, wherein the memory is further configured to:
   update the SIMD lane mask to reflect a remainder status of each of the plurality of SIMD Lanes, the remainder status indicating whether a particular SIMD lane is still unprocessed.

* * * * *